US008459660B2

(12) United States Patent
Livingston

(10) Patent No.: US 8,459,660 B2
(45) Date of Patent: Jun. 11, 2013

(54) MULTI FUNCTION PATIENT TRANSPORT

(75) Inventor: Troy W. Livingston, Northbrook, IL (US)

(73) Assignee: Livingston Innovations LLC., Buffalo Grove, IL (US)

(*) Notice: Subject to any disclaimer, the term of this patent is extended or adjusted under 35 U.S.C. 154(b) by 289 days.

(21) Appl. No.: 12/928,089

(22) Filed: Dec. 4, 2010

(65) Prior Publication Data

US 2012/0139197 A1 Jun. 7, 2012

(51) Int. Cl.
*B62B 5/02* (2006.01)
*B62B 5/04* (2006.01)

(52) U.S. Cl.
USPC ............ 280/5.22; 188/68; 188/69; 188/77 W; 188/77 R

(58) Field of Classification Search
USPC ............................. 180/8.2, 8.7; 280/5.2, 5.22
See application file for complete search history.

(56) References Cited

U.S. PATENT DOCUMENTS 1,940,693 A * 12/1933 Pearson .......................... 173/96
2,793,868 A * 5/1957 Fuglie et al. ................. 280/5.22
2,823,921 A * 2/1958 Lagaard ......................... 280/5.2
3,111,331 A * 11/1963 Locke .......................... 280/5.22
3,191,953 A * 6/1965 Aysta ........................... 280/5.22
3,227,465 A * 1/1966 Massie ........................... 280/5.2
4,962,941 A * 10/1990 Rembos ........................ 280/5.22
4,966,379 A * 10/1990 Mulholland ............... 280/242.1
5,020,818 A * 6/1991 Oxford ...................... 280/250.1
5,158,309 A * 10/1992 Quigg .......................... 280/5.22
5,277,436 A * 1/1994 Frank et al. ..................... 280/5.2
5,413,367 A * 5/1995 Ochiai ....................... 280/250.1
5,868,403 A * 2/1999 Culp et al. ................... 280/5.22
5,941,547 A * 8/1999 Drake ........................... 280/243

OTHER PUBLICATIONS

R. Lee Kirby & Angus D. McLean, "Preventing occupied wheelchairs from falling down stairs", Winter 1990, Journal of Rehabilitation Research and Development vol. 27 No. 1 pp. 27-32.*

* cited by examiner

*Primary Examiner* — J. Allen Shriver, II
*Assistant Examiner* — Conan Duda
(74) *Attorney, Agent, or Firm* — Leo J. Aubel

(57) ABSTRACT

A transport that is manually powered for transporting an injured or disabled person from one location to another. The chair is particularly useful for transporting an injured or disabled person (who is of a heavy weight) up or down a flight of stairs. The chair lift is manually driven by reciprocating hand levers operated by an attendant. A ratchet and pawl mechanism in combination with a brake system, which is continuously set/locked, allows movement of the chair only when the chair is being propelled up a flight of stairs and when an attendant purposefully actuates a hand lever to release the brakes and allow movement of the transporter.

3 Claims, 8 Drawing Sheets

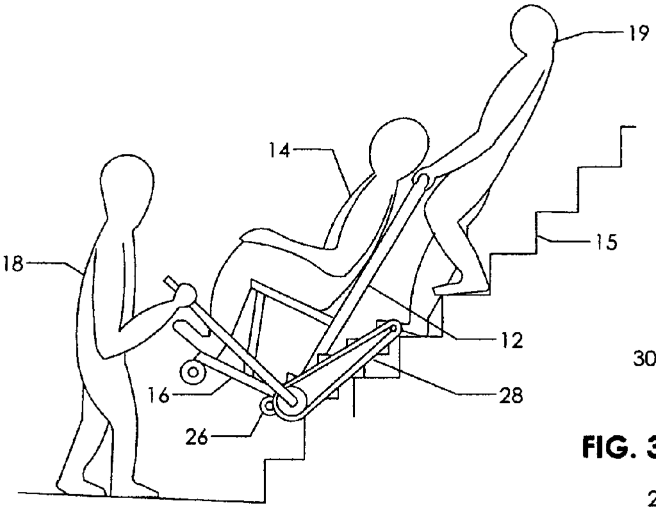
FIG. 2
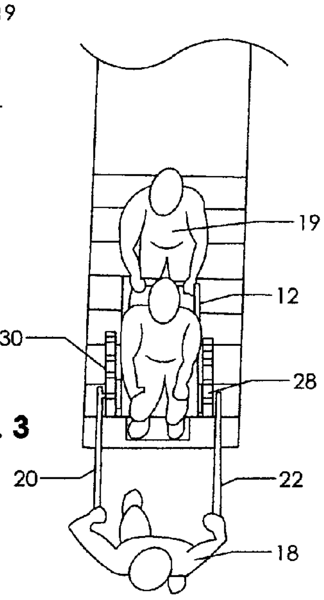
FIG. 3
FIG. 4
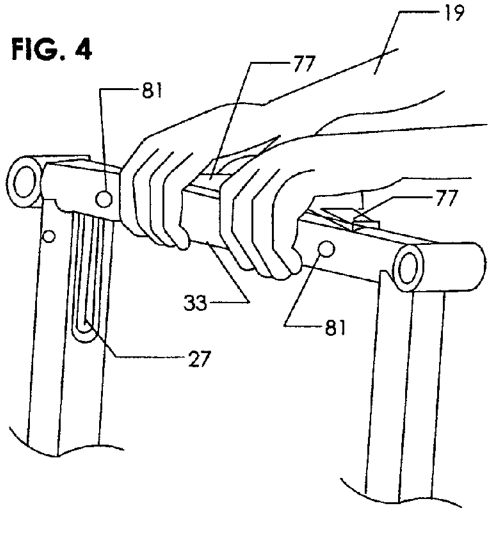

FIG. 6
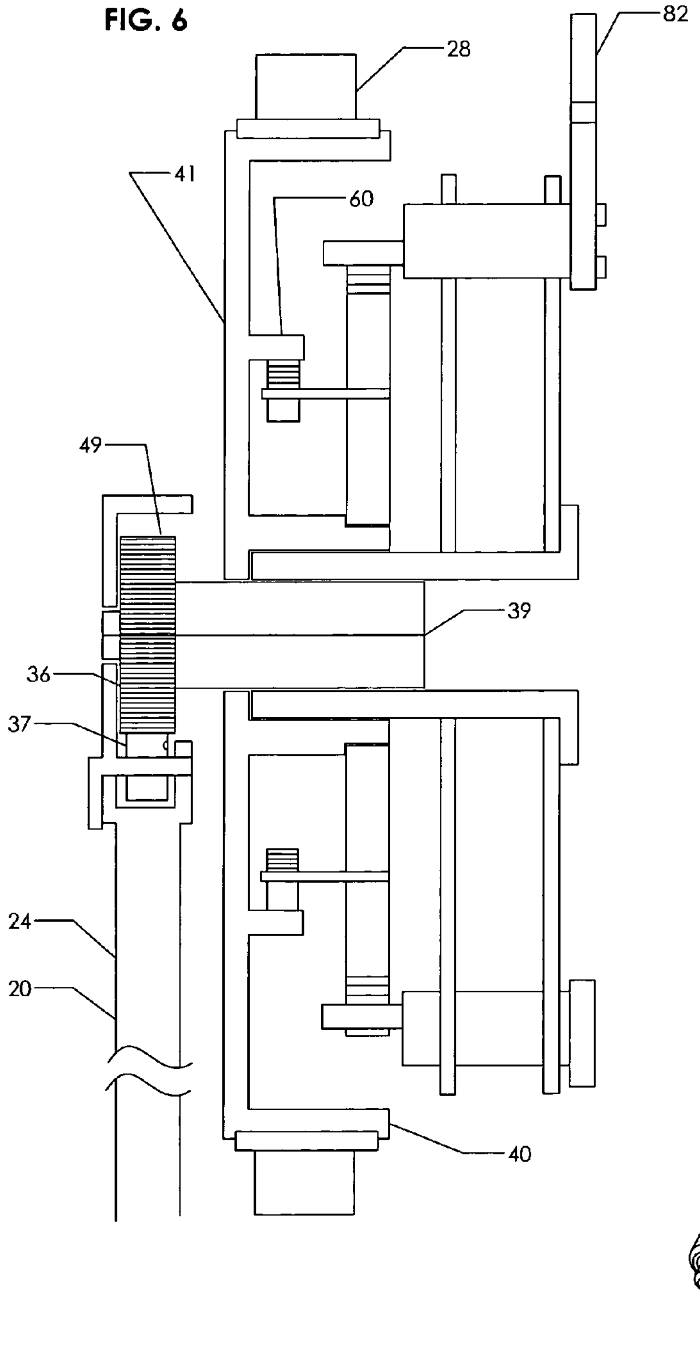
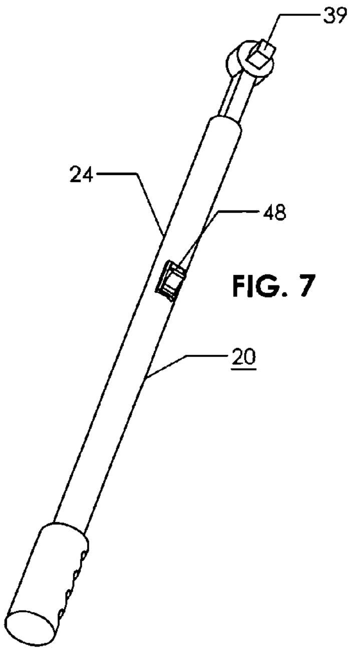
FIG. 7
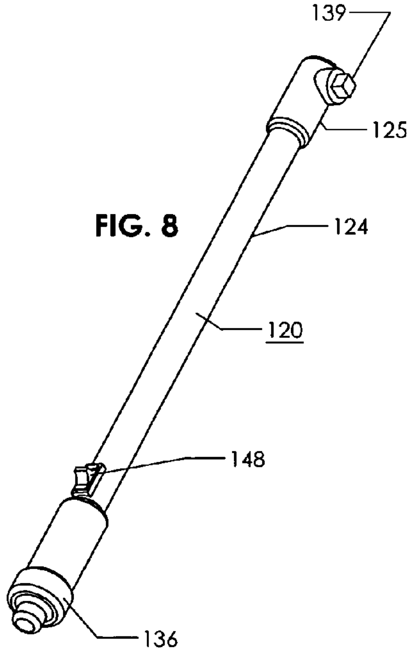
FIG. 8

MULTI FUNCTION PATIENT TRANSPORT

BACKGROUND OF THE INVENTION

This application claims the priority of the filing date of provisional patent application filed on Apr. 26, 2010 under the same title and under the name of the same inventor, Troy W. Livingston.

Medical patient transports (transporters) such as used medical transfer cots, wheel chairs, track mounted wheel chairs, and chairs for transporting a patient from one location to another location are well known in the art. The term "patient" as used herein refers to an injured, disabled or incapacitated person.

Available patient transporters include many forms and reference is made to U.S. Pat. No. 7,581,265 issued to Bourgraf et al; U.S. Pat. No. 4,962,941 issued to Rembos; U.S. Pat. No. 6,648,343 issued to Way et al and U.S. Pat. No. 7,520,347 issued to Chambliss et al. Also, motor driven transporters, either with loop tracks or multiple wheels, are known for supporting and moving a patient from one location to another.

As will be discussed herein below, Americans are becoming more obese and it is frequently most difficult, if not impossible, for one or two attendants to safely transport a heavy person from one location to another. The attendants who often are emergency medical personnel (EMT), firemen, or nurses have a critical need for equipment to carry or transport injured or disabled persons who may be heavy (more than 350 pounds) from one floor level to another floor level. For instance, if an injured person is in the basement of a house it may be necessary to transport an injured individual up a flight of stairs and to an ambulance for transfer to a hospital. If the injured person is unconscious, he or she must first be strapped onto a long medical back board/spine board in a prone position and then placed on the transporter. The problem may become quite critical if there is a fire in the building and firemen have to quickly move the person out of the building. In the process of transporting an injured person, up a flight of stairs, firemen often incur injury to themselves. As mentioned above, the problem has recently become more critical since the weight of Americans has increased most significantly in recent years. Even persons weighing more than 450 pounds are not too uncommon.

Conversely, transporting an injured person down flights of stairs often becomes an even more critical problem because the EMTs must assure that the transporter on which the injured person is being carried does get out of control and slip or slide down the stairs placing both the injured person and the EMTs in serious physical danger.

Thus, an object of the present invention is to provide a transporter that is manually powered to transport a patient from one location to another such as up and down a flight of stairs, which transporter can be used to transport a patient who may be obese, and which transporter can be normally operated as few as two attendants. The transporter can be configured as a chair or to support a medical long back board (spine board) on which a patient can be carried in a prone position from one location to another.

SUMMARY OF THE INVENTION

This invention relates to a manually powered patient transporter herein also referred as "transport" for conveying, carrying or moving (transporting) an injured or disabled person from one location to another and which is particularly for use in transporting a patient up and/or down flights of stairs. The transport can be utilized for transporting a patient up or down a flight of stairs in a seated position, and can be readily configured to provide support for a long medical back board (spine board) on which patent can be transported up or down a flight of stairs while in a prone position.

The invention further discloses a transport having drive wheels and associated closed looped mobile tracks (one each for the left and right side of the chair) and a unique improved braking system. Importantly, the braking system comprises a first braking system that is continuously set to lock the tracks and can be controllably released by hand lever controls. A second set of brakes effectively bypasses said first braking system to enable track movement in an upstairs direction when the transport is being manually powered up the stairs by reciprocating handles.

Other features and advantages of the present invention will become apparent from the following descriptions, taken in connection with the below listed drawings, wherein, by way of illustration and example, specific embodiments of the present invention are disclosed.

DRAWINGS

FIG. 2 is a view of the inventive transport on a flight of stairs with a patient seated thereon and being transported up a flight of stairs;

FIG. 3 is a top view of the transport of FIG. 2;

FIG. 4 is an isometric depiction of the hand controlled levers mounted on the frame of the transport;

FIG. 6 is view, partly in section, showing the transport drive train;

FIG. 7 is a view of the manual drive handle for the transport drive train;

FIG. 8 is a view of an electrically/rechargeable battery powered drive handle;

DESCRIPTION OF THE INVENTION

The invention comprises a transport (transporter) for transporting an injured or disabled person (which person may be quite heavy) from one location to another location. For purposes of this description, the person being transported will be referred to as the "patient" and the attendants doing the transporting will be referred to as EMTs (emergency medical personnel).

In a preferred embodiment, the transport is shown as chair for transporting a patient in a seated position. In a second embodiment the transport is configured for a medical back board/spine board that is designed to carry a patient in a prone position. Both embodiments shown are utilized by EMTs to manually transport a patient up and down a flight of stairs. The transport is manually operable by at least two attendants, wherein in one embodiment, one of the EMTs manually actuates reciprocating levers to power the chair up the stairs. Significantly, the levers and associated gearing provide a high mechanical advantage that enables the EMT to apply only moderate force to a manual lever system to power the chair up a flight of stairs carrying a patient load of as much as 500 pounds.

The invention includes a unique brake system comprising a combination of two cooperating brakes. The first set of said brakes or brake systems is always set or locked unless positively released by an EMT. The second set of brakes comprises a ratchet and pawl combination that allows the manually operated gear system to move the chair up the stairs during the "up stroke" of the levers and lock or stop movement of the chair down the stairs during the "down or recovery stroke" of the levers.

The inventive brake system assures the brakes positively and automatically stop the chair as needed should the EMTs slip or there if there is damage to the stairs, or there is otherwise a need to stop the descent.

Figure 1:
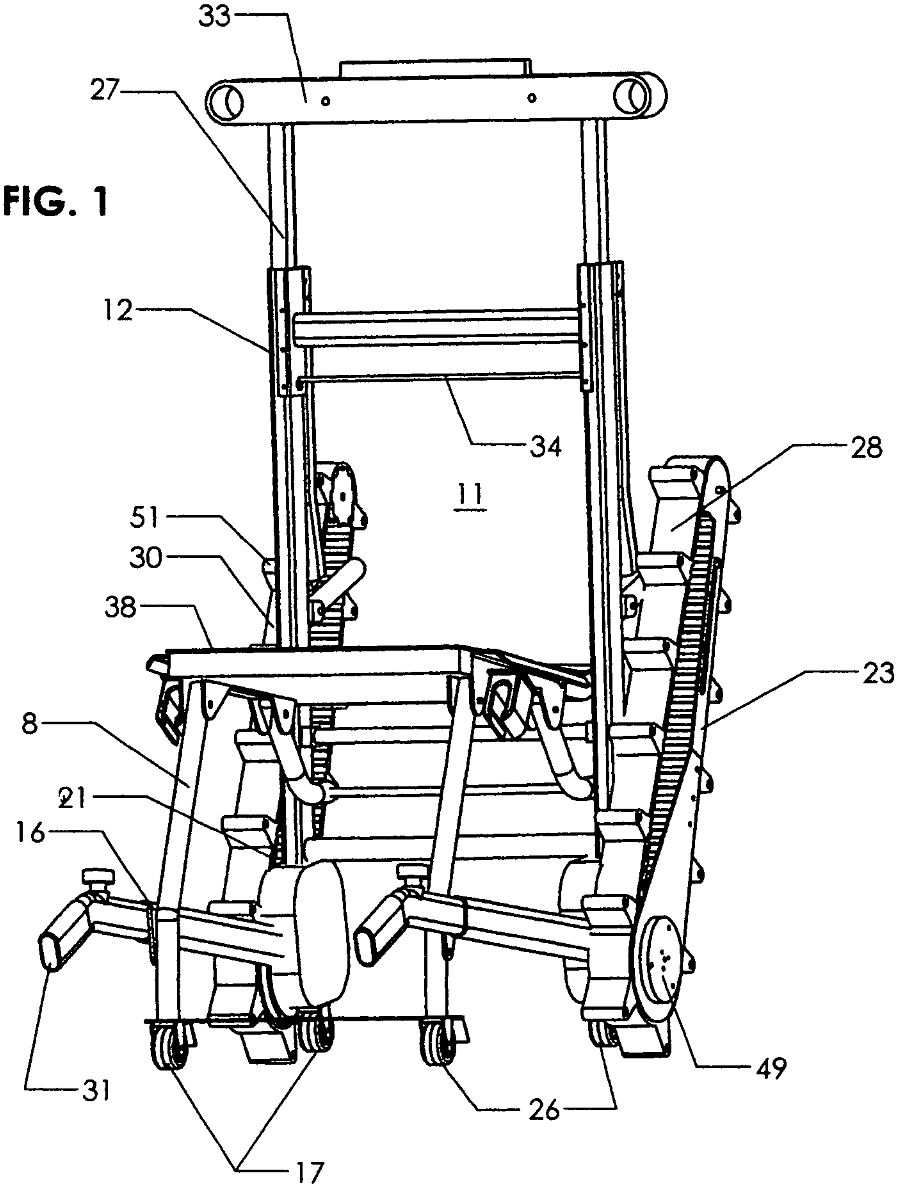
FIG. 1 is an isometric view of the inventive transport.

FIG. 1 depicts an embodiment of the inventive transport 11 utilized as chair 12 for transporting a disabled person (patient) 14 in a seated posture to be transported up and down a flight of stairs 15. Refer now also to FIG. 2 which shows a top view of the chair 12 of FIG. 1. As depicted in FIGS. 1 and 2, for safety purposes, the chair 12 and the patient 14 are moved up the stairs in a relatively reverse or backward position; that is, the patient is facing down-the-stairs as the chair 12 ascends the stairs. Suitable known belting, not shown, is provided to secure the patient on the chair. The chair includes cleated loop tracks 28 and 30 that are of sufficient length to engage multiple (at least three) stair steps to provide positive traction for the chair, with no slippage or bouncing.

When descending a flight of stairs 15, the chair 12 and patient 14 also face down the stairs 15. When transporting the patient on a relatively level floor the chair 12 and the patient may face forward and ride on the chair wheels 17 and 26.

Figure 5:
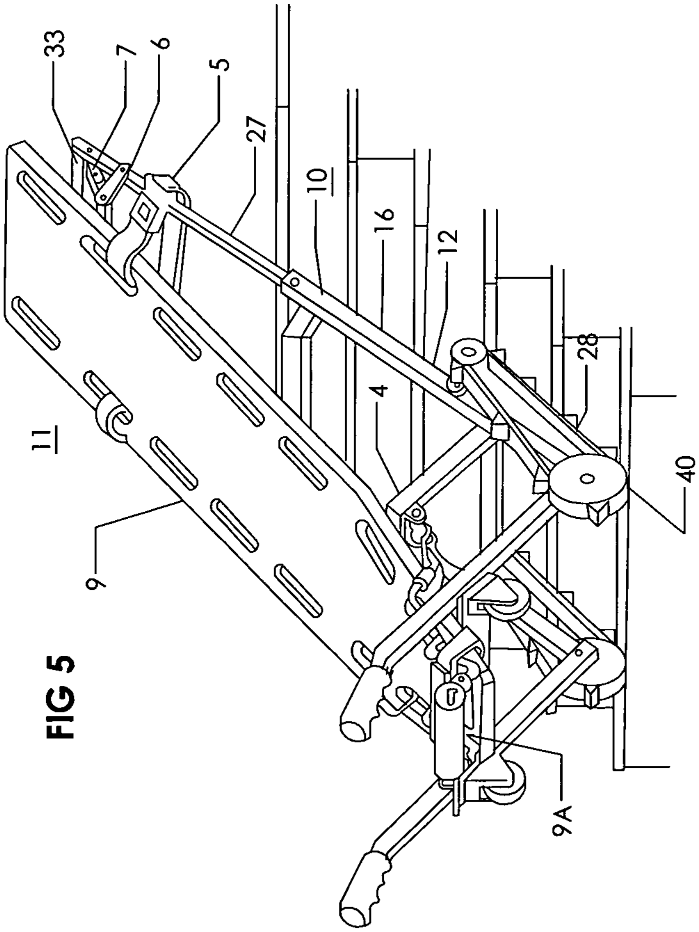
FIG. 5 is view of a long medical back board (spine board) affixed to the inventive transport for transporting a patient up a flight of stairs.

FIG. 5 shows the inventive transport 11 configured as a platform 10 to support a medical long back board/spine board 9. In this configuration, the upwardly extending arms 27 are telescoped or extended upwardly. Referring back to FIG. 1, a cable 34 is connected to a standard latch (not shown) which lock arms 27 in position, and pulling on the cable releases the latch and permits the arms to be extended. The top rail (stile) 33 of the chair is affixed to the top of the two arms 27. As best seen in FIG. 5, a U-shaped pivotal brace 6 extends adjacent to and spaced above the rail 33. In operation, arms 27 are extended and brace 6 is raised and locked on the frame 16 by bracket 7 to provide support for the top end (head) of spine board 9. Board 9 is fastened by suitable belting 5 on frame 16 to secure the upper end of the board on the chair frame. The lower end of spine board 9 rests on the edge of seat 4 of chair frame 16. Suitable belting, similar to belting 5, affixes the lower end of board 9 to the frame. The patient may be positioned on the spine board 9 and suitably secured on the board either prior to mounting the board on the transporter 12, or the board is mounted on the transport first and the patient lifted onto the board there after. A unique and adjustable foot support 9A is mounted on the lower end of spine board 9 to prevent the patient from sliding down the board when the board is at an angle such as depicted in FIG. 5.

The operation and function of the transport 11 when transporting a patient carried on a spine board 9 in a lying down position as shown in FIG. 5 is similar to that for transporting a patient in a seated position or chair 12 position as shown in FIGS. 1 and 2. Hence, a description of the chair mode applies equally thereto.

Note again that one of the important reasons for developing the present inventive transport 12 is for use in emergency situations to transport heavy persons up or down a flight of stairs. Two attendant persons that may be emergency nurses, firemen or technicians (herein referred to as EMTs) preferably operate the transport 11 (configured as a chair 12 or platform 10) to transport a patient up the stairs. For purposes of this description, the EMT positioned relatively below or downstairs of the chair 12 will be termed the downstairs EMT 18, and the EMT positioned above or upstairs of the chair will be termed the upstairs EMT 19. To move the patient up-the-stairs, EMT 18 stands in front of the chair 12 and EMT 19 stands behind and above the chair 12, as shown in FIGS. 1 and 2.

Two identical track bracket assemblies 21 and 23 are provide, one each mounted on opposite sides of frame 16 and hence a description of one will apply to the other. Track bracket assemblies support respective continuous loop tracks 28 and 30 (see FIG. 2) to provide the required stair-step traction. The tracks 28 and 30 are mounted on wheels, generally labeled 40, of respective hubs 41 and 43, and spaced idler pulleys, generally labeled 29, as is known. The track bracket assemblies 21 and 23, see FIG. 1 are each mounted to pivot on frame 16, and are selectively locked/latched to accommodate the angle of the rise/incline of the stairs. For storage such as in an ambulance, or to move over level ground, the tracks are folded onto frame 16.

EMT 18 provides the lifting or motive power for the chair by reciprocating lever handles 20 and 22, which extend forward from the sides of chair 12, see FIG. 3. The handles 20 and 22 are identical but separate units and each comprises an elongated rod 24 and a rectangular shaft 39 mounted on one end of rod and perpendicular to the rod. (A description of handle 20 applies equally for handle 22).

Figure 9:
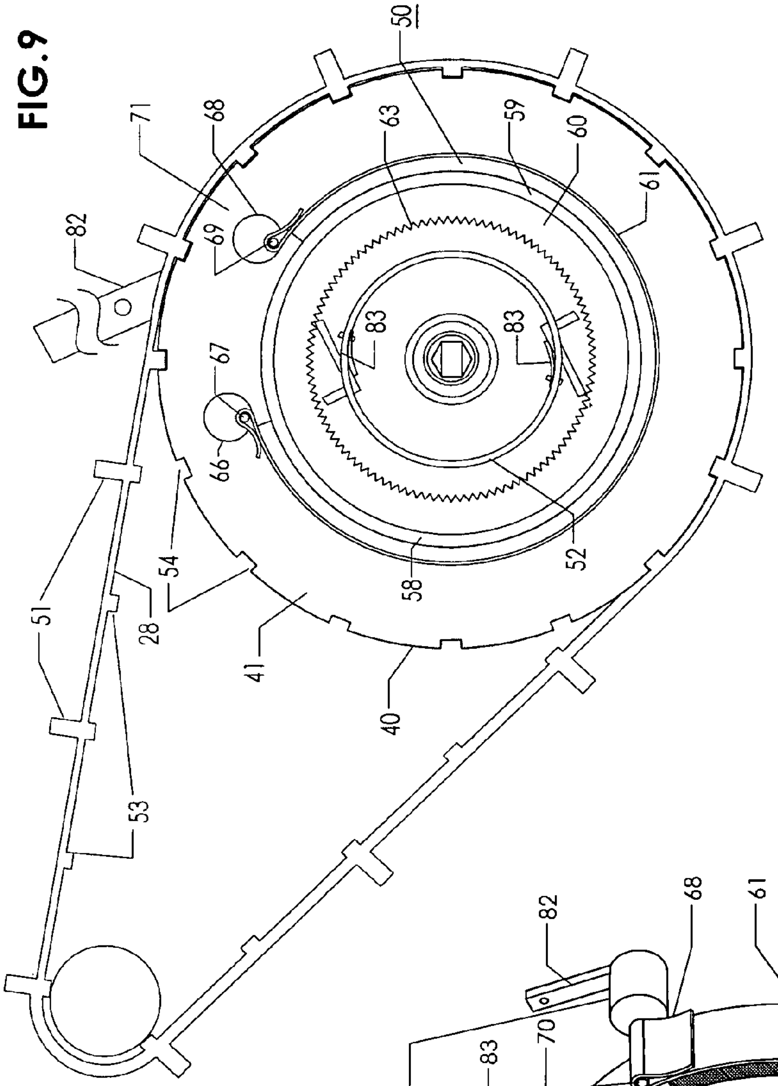
FIG. 9 is a view partly in section showing one of the braking systems for the transport, the associated drive wheel and track, there individual and separate braking systems on each side of the inventive transport.

Refer now to FIGS. 6 and 7, as well as FIG. 9. For operation, the shaft 39 of handle 20 is inserted into a suitable axle socket 49 in the wheel hub 41 to engage and rotate the hub 41 and wheel 40. A standard type adjustable ratchet 36 and pawl 37 assembly is affixed to handle 20. A known type reversing switch 48 is provided so that either handle 20 and 22 can be used on either side of the transport. Handles 20 and 22 thus provide pivoting levers having a highly leveraged mechanical advantage for powering the wheel hub 41. The two handles 20 and 22 operate independently of one another to power respective drive wheels 40, however in normal operation, the EMT 18 concurrently pumps (lifts) both the handles 20 and 22, as shown in FIG. 3. As the pivoting handle 20 is raised, pawl 37 engages ratchet 36 to provide motive power via shaft 39 and sockets 49 to rotate the wheel hub 41. Drive notches 54 in the wheel 40 of hub 41 (see FIG. 9) engage drive teeth 53 in the loop track 28 to rotate the track. At the end of the upward stroke the handle 20 is lowered to initiate the next power cycle, that is, reciprocated vertically. The reciprocating action is repeated to continue to rotate the drive hub 41 and the drive wheel 40 which engage and rotates the track 28. The cleats (treads) 51 on track 28 engage the stair steps to move the chair upwardly. As will be obvious, the identical operation occurs with the components related to each of handles 20 and 22 on the opposite sides of the transport. The downstairs EMT 18 thus provides all the power via the two handles 20 and 22 to propel/move the chair 12 up the flight of stairs 15; in this mode the upstairs EMT 19 only guides the chair on the stairs.

FIG. 8 depicts an electrically powered drive handle 120 that is powered by a rechargeable battery 136 mounted on handle 124 to drive a gear motor 125 including a right angle gear box including a drive shaft 139. The connection of handle 120 to the transport is the same as that for handles 20 and 22. It will be understood that the battery powered handles 120 can substitute for manual handles 20 and 22 to power the transport 11.

Referring again to FIG. 9, the two continuous loop tracks (track belts) 28 and 30 are of strong, commercially available synthetic material. The spaced cleats 51 are formed on the outside face of the tracks to engage the stair steps. Spaced teeth 53 formed on the inside face side of the track are engaged by drive notches 54 formed in the periphery of hub 41. The bracket assemblies 21 and 23 and the tracks 28 and 30 are of a sufficient length to engage at least three steps at a time (see FIGS. 1 and 2) to ensure a secure grip on the stairs regardless of the stair covering material, or the edge projection of the stair steps. As will be further explained, the inventive braking system 50 is continually set/locked to prevent the tracks from rotating and protect the chair 12 and patient from slipping/sliding down the stairs, and to prevent the chair from tending to fall downwardly during the handle downstroke (recovery or passive stroke), as will be explained below.

Power handles 20 and 22, and the respective ratchets and pawls in conjunction with the respective hubs 41 and 43 provide an approximately 10:1 mechanical advantage which enables the EMT 18 to use a lift force of 50 pounds to actuate the two handles 20 and 22 move a heavy weight of 600 pounds up a flight of stairs rising at an angle of some 45 degrees (note that the geometry of a 45-degree angle reduces the force needed to lift a load by a factor of 0.707). Thus, the invention provides a powerful lifting mechanism for manually transporting a very heavy patients up a flight of stairs with a high degree of safety, both for the patient and the EMTs.

While the two handles 20 and 22 are normally activated concurrently, each handle may be operated independently of the other such as for moving around a corner where more movement is required by one track versus the other track. Also, the handles 20 and 22 can be easily withdrawn and removed from socket 49 as desired for moving the chair on a landing, on level ground, or when descending a flight of stairs.

In one embodiment the handles 20 and 22 are telescoped up to be thirty-six inches long and are reciprocated (moved) up and down in about a sixty (60) degree arc to provide a high leveraged mechanical advantage. The length of the handles can be adjusted for the convenience of EMT 18.

Figure 10:
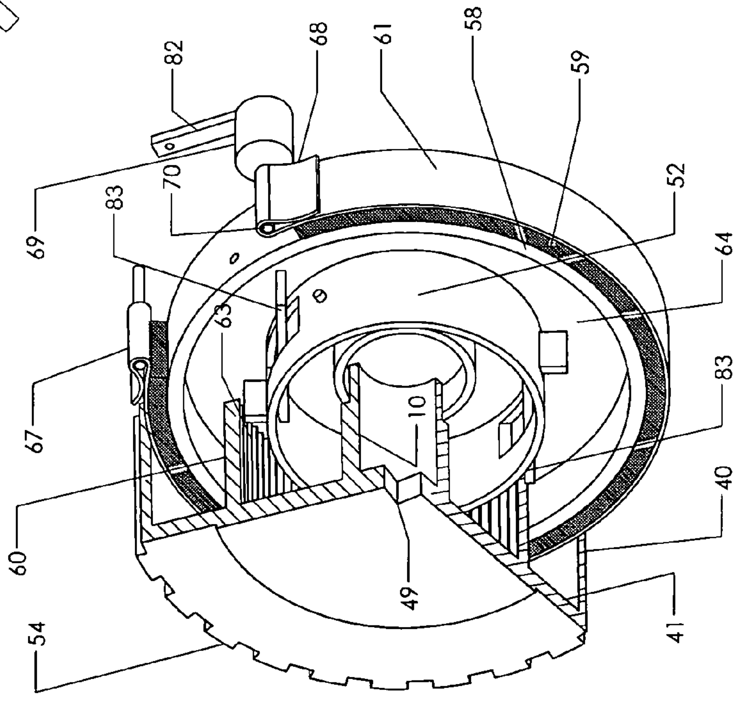
FIG. 10 is an isometric view of the braking system depicted FIG. 9.

Refer now to FIGS. 9 and 10 for the description of the structure and operation of braking system 50 and including that of the ratchet 63 and pawls 83. Wheel hub 41 includes a cylindrical flange 60 having a concave circle of ratchet teeth 63 formed therein. As shown, a pair of diametrically positioned spring biased pawls generally labeled 83 are mounted on a cylinder 52 affixed to a brake drum support ring 64. The pawls 83 are positioned at an angle and spring biased to glide past the ratchet teeth 63 to permit rotation of the hub 41 in one direction, i.e., in FIGS. 9 and 10 counter clock wise. If the wheel hub 41 tends to rotate in a clockwise direction pawls, 83 will engage the ratchet teeth 63 and stop rotation of the wheel hub 41. Thus ratchet teeth 63 and pawls 83 are used as a one way brake, i.e., the pawls and ratchet allow movement of the transport chair 12 in the up-the-stairs direction but stop movement of the chair in the down-the-stairs direction.

Figure 11:
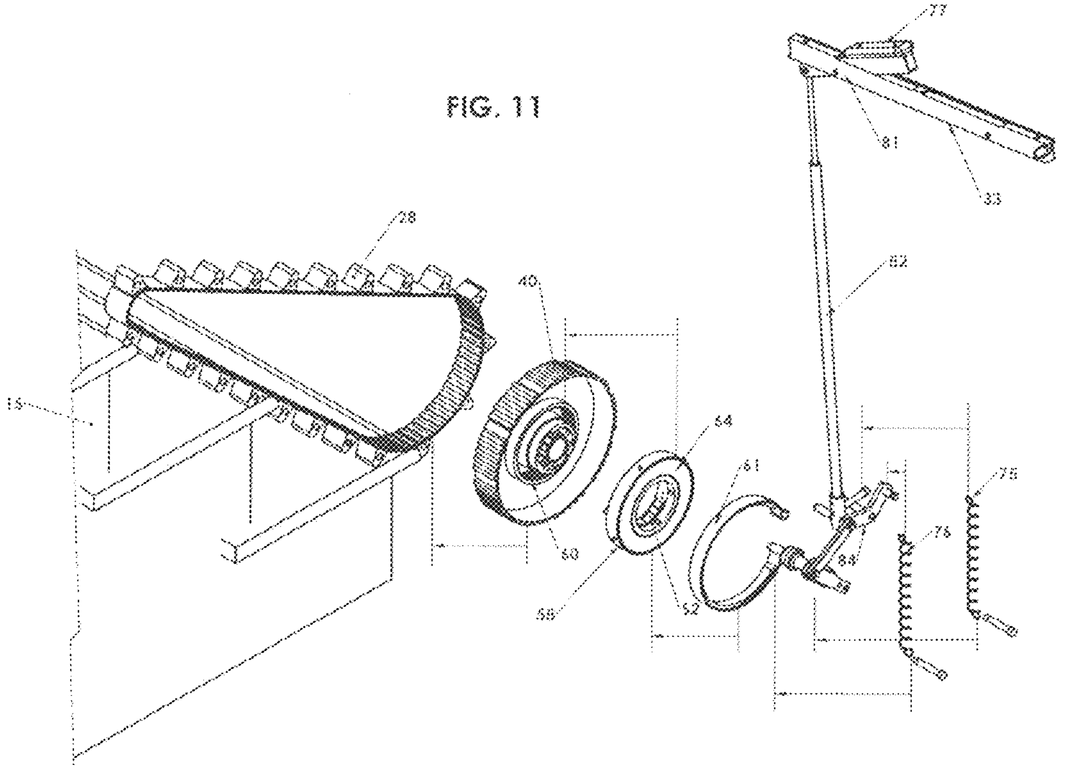
FIG. 11 is an exploded view of the braking system showing the lever connection to the control handle.
Figure 12:
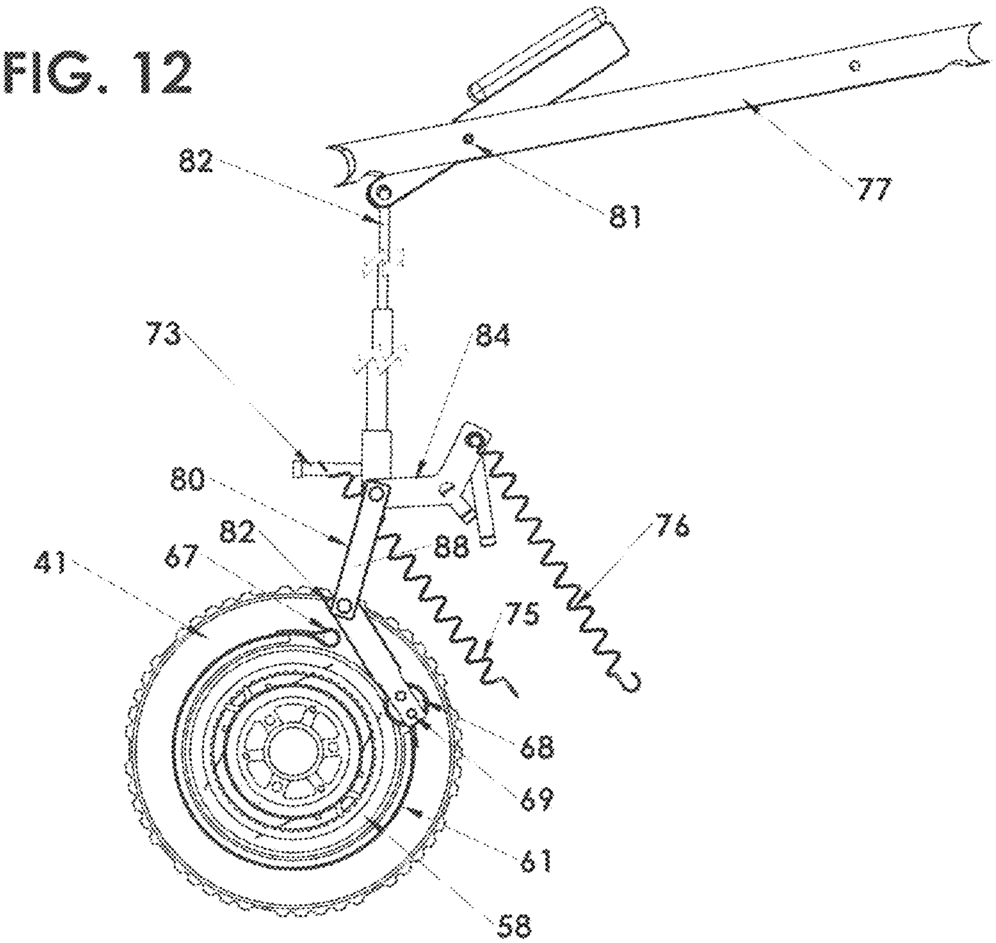
FIG. 12 is a view partially in section useful in explaining the operation of the leveraged control of the brake system.

Refer now also to FIGS. 4, 11 and 12 to for additional description of the braking system 50. As depicted in FIG. 4, EMT 19 controls two levers 77 mounted on the transport chair 12 rail or stile 33. As will be explained, the EMT 19 has full control of the braking system 50. FIGS. 11 and 12 show a brake tension spring 75 that draws a rod 82 downwardly (as oriented in the drawings) to cause a cam 70 to force brake band 61 to tightly engage the brake drum 58 via brake pad 59. Rod 82 is connected to lever 77 operated by the EMT 19. In the operating condition when the transport chair 12 is being moved up the stairs, the brakes of system 50 are in a continuous set/locked mode. The brakes continue to be set or locked unless the EMT 19 purposefully manually squeezes levers 77 to releases the brakes. Again the two braking systems 50 are the same but are independent one from the other and one lever 77 controls one braking system and the other lever 77 controls the other braking system. The brakes immediately return to their set or locked position when the EMT releases the levers 77.

When the power handles 22 are being actuated, the wheel hub 41, wheel 40 and loop track 28 can only freely rotate in one direction, that is up the stairs; the brake 50 locks the rotation of the wheel hub in the opposite or down direction. Importantly and as will be explained in more detail herein after, the ratchet 36 and pawl 37 allow the lifting forces provided by the handle 20 to bypass the action of the brake bands 59 on the brake drums 58 during the lifting stroke of the power lever handles 20 and 22.

As mentioned above, the brake system 50 always set or locked, unless released. Refer now to FIGS. 6 and 9-11. In the stair ascent mode, as the handle 20 is lifted (the power stroke) to power the chair 12 up the stairs, the pawl 37 on handle 20 engages ratchet 36 to rotate hub shaft 39 of wheel hub 41. Thus while the brakes are set and arresting movement of the brake drum 58 and cylinder 52, the brake system 50 must be bypassed when powering the transport 11 upwardly. As seen most clearly in FIG. 10, while the brake band 61 is arresting movement of brake cylinder 52, the center shaft 55 wheel hub 41 is being rotated and bypasses the locking action of brake band 61 and brake drum 58. The lifting action of the handle 20 causes hub 41 to be rotated about sixty degrees during each up-stroke of the handle 20. During the rotation of the hub 41, the pawls 83 on cylinder 52 slide past ratchet teeth 63 on flange 60 thus allowing wheel hub 41 to rotate.

At the end of the up-stroke, the handle is reciprocated downwards. The load on the transport chair 12 will tend to cause the track 28 to roll back which, in turn, will cause the drive wheel 40 and hub 41 to tend to roll backwards. However the pawls 83 which are angled outwardly will immediately engage the teeth of ratchet 63, see FIG. 9. The teeth of ratchet 63 are relatively finely spaced and are in continuous tight contact with the spring biased pawls 83. Since ratchet 63 is mounted on flange 60 that is in turn part of the hub 41, any backward motion of the track 28 is stopped. Note, that pawls 83 are mounted on cylinder 52 which is connected to the brake drum 58 which is set or locked, thereby sustaining the position of pawls 83 to brake backward (down-the-stairs) movement of the track 28. The wheel hubs 41 and 43 and tracks 28 and 30 thus hold their position each time the handle is moved (cycled) downward to prepare to initiate the next upward power cycle Another operating mode of the brake system 50 is during a stair descent with the brake system 50 partially released. As stated above the transport chair and the patient faces forward or down during the descent. Normally handles 20 and 22 are removed prior to descent down the stairs, and the down stairs EMT 18 helps to guide the chair frame 16 by handles 31.

The transition of the transport chair 12 and patient 14 from a level floor to initiate the transport of the patient down the stairs 15 is a demanding maneuver. As will be appreciated, not only must the transport chair 12 and patient be pushed forward, but the transport chair 12 and patient have to be turned, tilted and aligned with the flight of stairs 15. The upstairs EMT 19 is in full control of the descent and the EMT 19 must and hold the levers partially open as the transport chair 12 is pushed forward and down the stairs. To steer the transport chair 12, one of the hand levers 77 can to be opened or released more than the other lever i.e., the brake system 50 functions to steer the transport chair 12. The EMT 19 must continue to control the release of the levers 77 and hence the braking force of brake system 50 and the rate of rotation of drive wheels 40 and tracks 28 and 30 and thus the rate of descent down the stairs until the descent is completed, and also whenever the chair is to be moved. The EMT 19 is in total control. A basic safety feature of the invention is that should the EMT 19 slip, fall or lose control of the levers 77 during movement down the stairs, the braking systems 50 will automatically lock and the transport chair 12 (and the patient 14) will stay in its position on the stairs, and not fall down the stairs.

The descent mode requires a controlled partial release of the brakes. As mentioned, by controlling the degree to which the lever 77 is opened or released, the EMT 19 can control the rate of rotation of the track 28, to thereby control the rate of descent of chair 12. The load of the downward moving chair is opposed by the brake force. As the brakes are partially released, the wheel hubs, wheel and tracks are allowed to controllably rotate downward. The brake control is provided from levers 77 through 82, as will be further explained.

In yet another operating mode, the brake system 50 is released by fully squeezing release lever 77, and the transport chair is allowed to move down the stairs physically controlled by the EMTs. In this latter mode the EMT 19 must continue to squeeze the release lever 77 closed to allow the cylinder 52 to rotate freely, to allows the loop track 28 to rotate freely. Again, EMT 19 must hold the levers 77 closed, otherwise the brakes 50 will lock and stop the drive wheels and the tracks. This latter operating mode may be used with a light weight person that can be easily handled by two EMTs.

As mentioned above, the unique braking system generally labeled 50 comprises two-identical but individually operable braking subsystems, one for each of drive wheel of hubs 41 and 43. As emphasized above, the brakes in the present inventive system are normally in a set or locked mode, and the brakes are only released under the control of the EMT 19.

A unique feature of the present invention is a braking system that integrates the function of a drum type brake with a ratchet and pawl type mechanism, described above, to provide a positive and safe braking for a manually powered chair to safely transport a patient up and down a flight of stairs. The braking system 50 and the interrelation with the lifting mechanism as well as the method and mechanism for controllably releasing the brake will be described in further detail. As continually noted above, there are two identical, but separately operable brake systems 50, one for each of drive wheel hubs 41 and 43.

Refer now to FIGS. 11 and 12. The brake system 50 is a known type of drum brake, shown clearly in the drawings. System 50 includes a brake drum 58, brake pad 59 and a brake band 61. One end of the brake band 61 is formed as an anchor ring 67 and attached to a suitable support. The other end of the brake band 61 is also formed as anchor ring 68 and is mounted on pin 69 of brake drum control cam 70. A tension of spring 75 has one end connected to a stationary support on frame 16 and the other end is coupled to arm 73 of extension rod 82. The tension force of spring 75 applied through articulated arm 80, bell crank 84, pin 69, and cam 70 cause brake band 61 to tightly encircle brake drum 58. Tension spring 75 provides a tension force that is translated via a very large mechanical advantage effected by arm 80 and scissor like sections 82 and 88 to apply a high braking torque via brake band 61 to the brake drum 58. This provides the high braking torque to the drive wheel 40 for track 28. Thus, the brake system 50 is normally in a set and locked mode by the force of tension spring 75.

Since there are two braking systems 50, one for each of hubs 41 and 43, it was calculated that a torque tension of more than one thousand pounds on one brake drum is added or combined with the torque tension of the other brake drum to provide a very high safety margin of braking torque.

The brake release mechanism will now be further described. Referring to FIG. 11, two braking system control levers 77 are housed in top rail 33 of the chair frame 16 (see also FIGS. 1 and 4). Each lever 77 controls one of the braking systems independently of the other lever. A description of one lever applies to the other lever. One end of lever 77 is connected to an extension rod 82 that is coupled to the braking system 50. The pivoted mounting of lever 77 on pin 81 obtains a 2.5 to 1 mechanical advantage as the lever is squeezed to close and lift rod 82. Mounting the levers 77 on the rail 33 allows the EMT 19 to grip and control the actuation of the brake release levers 77 at the same time that EMT 19 is holding onto the chair frame 16.

Since the braking system 50 is normally set or blocked, the control levers 77 must be gripped and squeezed by the EMT 19 to hold the levers in a closed position to permit the drive wheels and tracks 28 and 30 to be moved down the stairs. (As mentioned, a description of one of the levers 77 is equally applicable to the other lever.) To close the lever 77 the EMT 19 thus must initially overcome the tension force provided by spring 75. The control provided by the EMT 19 must be smooth and continuous ("feathered") to enable the chair to move steadily down the stairs, to slow down or to increase the rate of descent. Since the EMT 19 will be holding the release lever 77 closed for an extended period, the fatigue factor must be considered, hence the hand grip force required to maintain the handles closed is reduced by the present invention.

Refer to FIGS. 11 and 12. Lever 77 connects to one end of section 88 of articulated arm 80 via rod 82. The EMT 19 can apply more or less hand grip pressure to lift rod 82 to thereby control the braking torque of the respective brake and thus can control the rate of descent or stop the chair 12. Because of the mechanical advantage provided by the various components of the braking systems 50 including a 2.5 to 1 mechanical leverage attained by pivoted lever 77, and the provision of a pull off spring 76 the tension force pounds provided by the tension spring 75 can be overcome by about twenty pounds of force developed by the hand grip of the EMT 19.

Arm 73 extending outwardly from pull rod 82 is biased down by tension spring 75. An articulated arm 80 comprising two elongate sections 82 and 88, and bell crank 84 is connected to brake band actuating cam 68 and functions as a scissor linkage to control the brake band 61.

Section 82 of arm 80 is an elongated member and has one end pivotably connected to pin 69 of cam 70. Pin 69 is affixed at a point off-center of the cam 70 which in turn is connected to brake band 61. Movement of arm section 82 moves pin 69 to rotate and move cam 70 to selectively tighten or loosen brake band 61 on brake drum 58. The other end of arm section 82 is pivotably connected to one end of arm section 83 which is also an elongated member. The other end of arm section 83 is pivotably connected to pull rod 82 and to arm section 84 comprising a bell crank. One end of bell crank 84 is pivotably connected to pull rod 82 and the other end of bell crank 84 is connected to one end of pull off or tension release spring 76. Tension release spring 76 and bell crank 84 function to aid in controllably releasing the brake 50 from a locked mode, as will be described.

Each braking system 50 (both of the brakes on drive wheel hubs 41 and 43) is normally locked mode. As previously emphasized this locked mode is a safety feature to assure that the brake system immediately stops the transport 11 should the EMTs fail to maintain control, either because the EMT slips or because a faulty stair step causes the transport to slip or slide.

Note that as handle 77 is squeezed to close, rod 82 is pulled up and the pin 69 is pushed to the right by arm section 82, and cam 68 rotates clockwise to loosen the brake band 61 on brake drum 58 to reduce the braking force on brake drum 58 and permit the wheel hub 41 to rotate.

Referring to FIG. 4 as well as FIGS. 11 and. 12, EMT 19 needs to use of gripping force of about twenty pounds to initiate the closing movement of the pivoted hand control lever 77 (see also FIG. 2) to lift connecting rod 82. Thus, as lever 77 is closed to lift rod 82, arm sections 82 and 83 spread apart and arm 82 moves (to the right in FIG. 13—to the left in FIG. 14) to reduce the tension of brake band 61 on brake drum 58.

It should be appreciated that the gripping force on control lever 77 can be varied to control the rate at which the drive wheel 40 and the associated tracks 28 are rotated. A resulting advantage is that the pressure applied to limit the braking torque can be smoothly and continuously controlled by the gripping force applied to lever 77 by the EMT 19. It has been further found that a high and mechanical advantage is provided by sections 82 and 83, and a pivoted bell crank 84. The initial hand grip force required on the hand lever 77 to initiate closure of the lever (mentioned above as being 20 pounds) is higher then the force required to maintain the lever 77 in a fully closed position. The foregoing feature also results that positions of lever 77 can be slightly opened and closed to smoothly control the rate of rotation of the drive wheels and track. A further advantage is that the EMT 19 can hold the levers 77 closed with light force thus avoiding fatigue.

Referring now to FIG. 12, as the hand lever 77 is squeezed, tension spring 75 is stretched to relieve the spring tension on the brake cam arm 82. A tension pull off or release off pivotably mounted spring 76 to selectively counter the braking force tension of spring 75. As the hand lever 77 is applied, the bell crank 84 and arm 86 rotate to provide a longer lever arm and a higher pull off force by spring 76. As the bell crank 84 rotates, the angle at which the pull off spring 76 applies its tension results in a higher leverage force to subtract from the tension applied by the tension force applied by spring 75. Thus as the hand levers 77 are actuated, the initial hand grip force required by the EMT is reduced. The force provided by the release spring 76 subtracts from the pound force of the brake tension spring 75, and accordingly reduces the hand grip force necessary to maintain a closed position of the hand lever 77.

Figure 13:
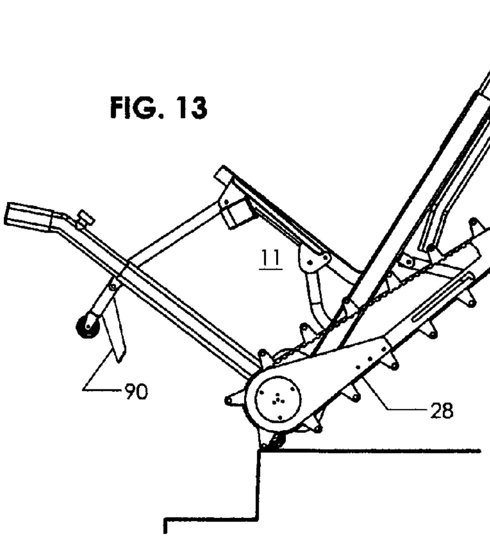
FIG. 13 is a view showing the required tilting operation of the transport when initiating movement of the transport down the stairs.

Refer now to FIG. 13. The ratchet levers handles 20 and 22 are not required for downstairs motion and can be removed when movement is to move down the stairs. The upstairs EMT 19 that is gripping the chair rail 33 provides all of the control for the down stairs movement, and the downstair EMT 18 merely guides the chair via arms 31.

The transport 11 will maintain its position on the stairs with minimal or no assistance by the EMTS; that is, the brake system 50 is continuously in a locked position and will retain the transport stationary on the stairway until the upstairs EMT 19 positively releases the brakes by squeezing the lever handles 77. To initiate a downstairs movement, the brakes are slightly released and transport 11 is tilted back to move the transport over the edge of the top step to allow the cleats to engage the top step of stairs 15. The EMT 19 then activates the brake levers 77 to controllably release the braking force and allow the tracks 28 and 30 to rotate and commence down stairs movement. Note that the right and left brake levers release the respective right and left brakes independently. By depressing one brake lever more than the other and selectively releasing the brake pressure, the transport 11 can be steered as desired.

As an important safety feature of the inventive transport chair 12 is an anti-tipping plate 90 is positioned behind each front caster wheel 17. Refer now to FIG. 13-16. If, when initiating a down stairs movement, the front caster wheel 17 are accidently pushed over the top step 93 before the transport 11 has been properly tilted back and the transport tracks 28 and 30 are not in contact with the stair steps, front caster wheels 17 will drop down and the anti-tipping plate 90 will engage (grip) the top floor surface (land) and stop movement of the transport 11. Note that this stopping or blocking action is only functional when the transport has not been properly tilted back to initiate the safe downward movement of the transport.

Figure 14:
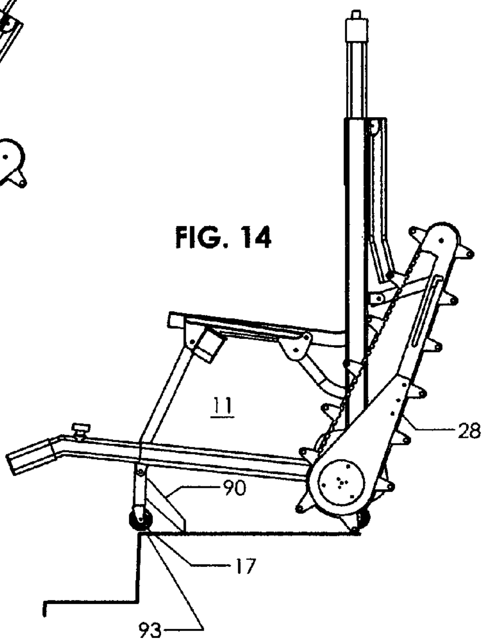
FIG. 14 is a view of anti-tipping plates that are mounted behind each of the front caster wheels of the transport.
Figure 15:
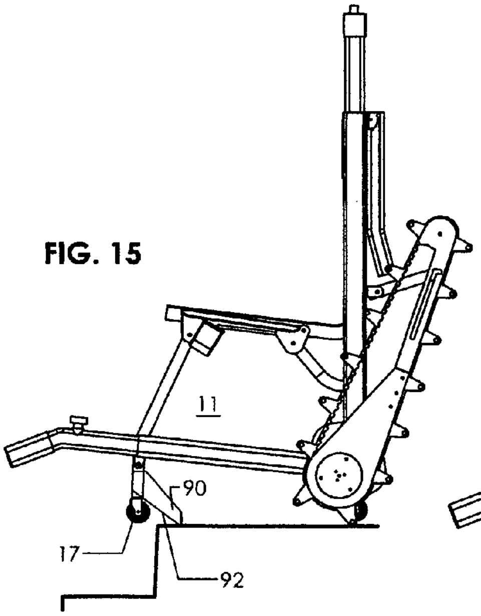
FIG. 15 depicts the operation of the anti-tipping plates.

Thus, the anti-tipping plate 90 is intended to prevent the transport 11 and the patient 14 from pitching down the stairs. Unprepared movement of the transport 11 is prevented. FIG. 13 depicts the required tilted position at which the transport must be so as to enable the tracks 28 and 30 to properly engage (contact) the stair steps to initiate as movement of the transport down the stairs. If instead of the tilted position, the transport 11 is moved over the top edge of the stairs as depicted in FIG. 14, that is before the tracks 28 engage the stair steps, (and without the anti-tip plate) the transport 11 may tip over and cause the transport and the patient to pitch uncontrolled down the stairs. As clearly seen in FIG. 15, if the caster wheel 17 is moved over the edge of the stair step, the anti-tipping plate 90 will engage the floor surface and arrest further movement of the transport.

Figure 16:
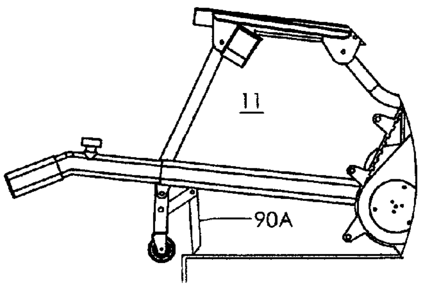
FIG. 16 shows another embodiment of the anti-tipping plates.

The free (distal) end 92 of the plate 90 extends downwardly from the transport frame to a position about one and one eighth inch from the lower surface of the caster wheel 17, and about one inch from the rear surface of the caster wheel. Again, if the transport (chair) is in an upright position, and not in the required backwardly tilted position to initiate a down the stairs movement, as soon as the front caster wheels 17 move and drops over the edge of the top step, anti-tipping plate 90 will engage the floor surface and stop movement of the transport. Note that when moving over a level surface, the anti-tipping plate is non-functional. FIG. 16 show an embodiment of the anti-tipping plate 90A wherein a second elongate section 93 is added further to brace the plate against the transport frame 16.

While the invention has been particularly shown and described with reference to preferred embodiments thereof, it will be understood by those skilled in the art that various changes in form and details may be made therein without departing from the spirit and scope of the invention.

The invention claimed is:

1. A patient transporter comprising:

a) a foldable frame including an upper rail and having a first configuration as a chair having a seat for a patient for enabling a minimum of two attendants to convey a patient up and down flights in a seated position and a second configuration as a support for an elongated medical backboard for enabling a minimum of two attendants to convey a patient in a prone position up and down a flight of stairs;

b) said backboard including a foot support mounted at the lower end of said backboard to prevent the patient from sliding down the backboard when said backboard and patient are at an angle and are being moved up and down the stairs when said frame is in said second configuration;

c) extensible arms coupling said upper rail to said frame and which telescope outwardly to accommodate the length of the backboard when said frame is in said second configuration;

d) means for strapping said backboard to said frame with a front edge of said seat supporting one end of said backboard when said frame is in said second configuration;

e) bracket assemblies mounted on said frame;

f) loop drive tracks mounted on said bracket assemblies;

g) drive wheels and associated wheel hubs for driving said tracks;

h) manually powered drive trains including removable lever handles that are reciprocated up as active power strokes and down as a passive or recovery strokes, to drive said power trains and said drive wheels up the stairs;

i) a first braking system including brake drums and associated brake bands mounted to engage said wheel hubs;

j) springs for maintaining said brake bands in locked contact with said brake drums and said wheel hubs to thereby stop rotation of said drive wheels unless manually released by an attendant;

k) said manually powered drive trains by-passing said first braking system;

l) a second, and one way, braking system for braking said power train, said second braking system including respective ratchet and pawl assemblies and being selectively engaged to said first brake system for by-passing said first braking system and enabling said wheels and hubs to rotate in a single direction when said lever handles are powering said wheels up the stairs and also for providing a braking action to said wheels during said passive or recovery strokes of said lever handles, with said second braking system controlling down-the-stairs movement of said transporter; and m) control levers mounted on an upper rail of said frame, to enable the attendant at the upper end of said backboard to manually release said springs and therefore control said first braking system.

2. A transporter as in claim 1 wherein a) said extensible arms further comprise a brace that is pivotable between a lowered position and a raised position for providing additional support for a top end of said backboard.

3. A transporter as in claim 1 wherein when said frame is in said second configuration a) said backboard is consistently in a supported position wherein an attendant can provide instant care to the patient's head and face.

* * * * *